United States Patent Office 3,377,324
Patented Apr. 9, 1968

3,377,324
METHOD FOR PREPARING POLYSULFONES
Simon Mostert, Amsterdam, Netherlands, assignor to Shell Oil Company, New York, N.Y., a corporation of Delaware
No Drawing. Filed Mar. 17, 1966, Ser. No. 535,007
6 Claims. (Cl. 260—79.3)

This invention relates to a method for preparing polysulfones.

It has recently been found that useful and stable polymers are those obtained by hydrogenating unsaturated copolymers of a conjugated diolefin and sulfur dioxide and terpolymers and quaterpolymers of conjugated diolefins, sulfur dioxide and other polymerizable unsaturated hydrocarbons. Methods of preparing these highly stable, and in certain cases, crystalline polymers are disclosed in copending application Ser. No. 431,856, filed Feb. 11, 1965.

The unsaturated polysulfones which are to be hydrogenated are prepared by a variety of methods such as by emulsion or suspension techniques or in the presence of solvents as disclosed, for example, in the copending application referred to above. It has been found that such polymers have a tendency to cross-link during preparation thereby forming a gel. In order for the unsaturated polysulfones to be hydrogenated they must be placed in solution or at least swollen by a suitable solvent. Thus, any gel formation is highly undesirable since it renders the unsaturated polymers insoluble in solvents to be used in the hydrogenation procedure thereby adversely affecting the rate and ease with which the unsaturated polymers are hydrogenated. In addition, the gelling adversely affects the ease of workability of the hydrogenated polymer in preparing products. This affect is particularly important where the hydrogenated polysulfones are to be extruded to produce fibers which is one of the most important uses for the crystalline polymers.

Generally, to repare suitable fibers having desirable properties for use in preparing fabrics and the like, polysulfones having intrinsic viscosities of at least about 0.5 and especially these having intrinsic viscosities above about .8 are preferred. However, due to the cross-linking of the unsaturated polymers and particularly those prepared by emulsion techniques it has been found that the hydrogenated polymers having such desirable viscosities are difficult if not impossible to satisfactorily extrude. Thus, it has been often necessary heretofore to use less desirable polysulfones having relatively low viscosities in preparing fibers. Even then, such polymers having intrinsic viscosities as low as about 0.2 are often found to be gelled and difficult to hydrogenate and extrude.

In attempting to overcome the cross-linking problem, known cross-linking modifiers such as mercaptans, carbon tetrachloride, chloroform and the like are ineffective in suitably reducing or eliminating the gel formation. Attempts have also been made to effectively reduce or eliminate the cross-linking and resulting gel from the polymer preparation by stopping the polymerization at some point before complete conversion of the polymerizing monomers. Such a method is known to be effective in the preparation of synthetic rubber to produce butadiene containing polymers that are free from undesirable gel. However, in the case of polysulfones such a method for effectively reducing the gel by termination of the polymerization reaction prior to completion is not satisfactory. In some instances, for example, it is found that polysulfones contain undesirable gel at as low as 20% conversion.

It is therefore an object of this invention to provide a method for reducing or preventing gel formation of polysulfones. It is also an object to provide a method for preparing polysulfones which are suitable for melt spinning and similar applications which have intrinsic viscosities which are higher than those which have been suitably processed heretofore. These and other objects will become apparent from the following description of the invention.

It has been discovered according to the invention that polysulfones may be prepared in which gelling is effectively reduced or eliminated by the use of a small amount of a compound characterized by one or more groups.

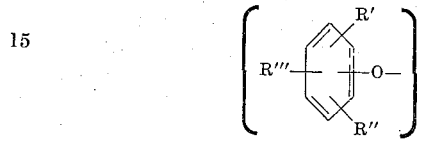

wherein R' and R" are hydrogen, alkyl or aryl groups and R''' is hydrogen, alkyl or hydroxyl. R' and R" are preferably hydrogen or lower alkyl groups of from 1 to about 6 carbon atoms. The presence of oxy-phenyl compounds of this type during polymerization prevents gelling of polysulfones even up to 100% monomer conversion. Thus, polysulfones having intrinsic viscosities up to about 5.0 or higher may now be prepared without gelling and which are easily hydrogenated and extruded to form fibers or which may be processed in other ways.

The preferred polysulfone anti-gelling agents are phenols, triaryl phosphites and aryl borates. Suitable phenolic compounds and their alkylated derivatives are those having from 6 to about 40 carbon atoms and include, for example, phenol, ortho-, meta- and paracresol, 2,6-dimethylphenol, 2,4-dimethylphenol, 4-tert-butylphenol, 2,6-ditert - butylphenol, 2,6-dimethyl-4-tert-butylphenol, 4-methyl- 2,6-ditert-butylphenol, etc., polyhydric phenols such as catechol, para-tertbutyl catechol, hydroquinone, polynuclear polyhydric phenols such as 2,2'-methylene-bis-(4-methyl-6-tert-butyl phenol), 4,4'-methylene-bis(2,6-ditertbutyl phenol), 1,3,5-trimethyl-2,4,6-tris(3,5-ditert-butyl-4-hydroxybenzyl)benzene, etc. The preferred triaryl phosphites are the tri(alkylaryl)phosphites such as tri-(methylphenyl)phosphite, tri(tert-butylphenyl)phosphite, tri(nonylphenyl) phosphite, etc. The aryl borates include, for example, triphenyl borate, tricresyl borate, 2,6-ditert-butylphenyl di-n-butyl borate, 2,6-ditertbutylphenyl di-n-butyl borate, 2,6-ditert-butyl-4-methylphenyl di-n-butyl borate, etc.

The amount of anti-gel agent used is between about 0.001 and 1% by weight based on the total polymerization reaction mixture. The material is added to the polymerization mixture in any suitable manner and thus may be conveniently incorporated along with the monomers or catalyst or emulsifying agent prior to initial polymerization. The order or manner in which the ingredients are mixed is not critical and any convenient method may be used.

The polysulfones improved by the invention are those prepared by the emulsion polymerization technique. The technique is well known to those skilled in the art and in general consists of polymerization of the monomeric components in an aqueous medium in the presence of an emulsifying agent and suitable catalysts.

The improved unsaturated polysulfones prepared according to this invention are copolymers of a conjugated diolefin and sulfur dioxide or ter- or quaterpolymers of a conjugated diolefin, sulfur dioxide and another polymerizable ethylenically unsaturated compound. Suitable conjugated diolefins are those having from 4 to about 8 carbon atoms and include 1,3-butadiene, 2-methyl-1,3-butadiene (isoprene), 1,3-pentadiene, 1,3-hexadiene, 2,4-hexadiene, chloroprene, cyclopentadiene, cyclohexadiene, cyclooctadiene, etc.

When preparing terpolymers or quaterpolymers other suitable ethylenically unsaturated compounds which may be used preferably include those having from 2 to about 20 carbon atoms such as propylene, butenes, isobutylene, pentenes, hexenes, cyclopentene, etc.; vinyl aromatic having from 8 to about 12 carbon atoms such as styrene, etc.; substituted olefins including halogen, cyano, amino, carboxyl, or carboxylate ester and hydroxyl substituted olefins of from 2 to about 10 carbons atoms, such as vinyl chloride, vinylidene chloride, ethyl acrylate, acrylonitrile, allyl amine, allyl alcohol, butenyl cyanide; conjugated dioefins of from 5 to about 8 carbon atoms such as 2,3-dimethylbutadiene, piperylene, isoprene, chloroprene, 4-cyanobutadiene-1,3, cyclopentadiene, cyclohexadiene, 1,3- and 2,4-hexadiene, 1,3-cyclooctadiene, etc.; acetylenes such as acetylene, vinyl acetylene, methyl vinylacetylene, and triolefins (hexatriene, etc.).

The emulsifying agent used is not critical and may be anionic, cationic or non-ionic. However, since the aqueous phase is present usually in greater quantity than the oil phase, the use of anionic agents resulting in an oil-in-water type emulsion may be preferred. Suitable emulsifying agents which may be used include such materials as the fatty acids and their soaps including substituted derivatives of the fatty acids and rosin acids, sulfuric esters including salts of sulfated fatty oils and alcohols, alkane sulfonates, alkarylsulfonates, mahogany and petroleum sulfonates, as well as phosphorous containing emulsifying agents. Some specific examples include the alkali metal salts of $C_{12}$ to $C_{18}$ straight chain carboxylic acids, i.e., sodium stearate, sodium oleate, and mixtures thereof as acids obtained from tallow, coconut oil, palm oil, etc., tall oil acid soaps, sodium lauryl sulfate, sodium dodecylbenzene sulfonate, sodium di(2-ethylhexyl)orthophosphate and the like. Any amount of emulsifying or suspending agent may be used which will provide at least a relatively stable emulsion or suspension of the polymerization ingredients. Generally, from about 0.5 to about 10% by weight of emulsifying agent is sufficient.

The polymerization reactions whereby the unsaturated polysulfones are prepared are catalyzed by a free radical initiator such as peroxides, azo compounds or inorganic oxidizing agents which may react with sulfur dioxide to yield a redox initiator system. Some specific example include hydrogen peroxide, benzoyl peroxide, cumene hydroperoxide, di-tert-butylperoxide, ascaridole, tert-butyl hydroperoxide, acetyl peroxide, peracetic acid, silver nitrate, lithium nitrate, ammonium nitrate, as well as chlorates, perchlorates, nitrates, persulfates, trimethylamine oxide, dimethylaniline oxide, nitric oxide, nitrogen dioxide, perchloric, nitric and nitrous acids, diisobutylene ozonide, azobisisobutyronitrile etc. These catalysts may be present in amounts between about 0.01% and 5% and preferably between about 0.01% and 1.0% by weight.

Temperatures in the polymerization reaction are suitably between about $-60°$ C. and $120°$ C. at autogeneous pressures. The ratio of monomers may be varied depending on the concentration of the respective hydrocarbon monomers present in the polymerization product. The most desirable ratio may vary and can be determined readily by those skilled in the art. Generally, when terpolymers are prepared, it is preferred to have the ratio of the different hydrocarbon monomers between about 20:1 and 1:20.

The unsaturated polysulfones prepared by the process of the invention are of relatively high molecular weight of about 20,000 to 1,000,000 corresponding to intrinsic viscosities of between about 0.4 and 5.0 dl./g. determined in 1:1 mixture of m-cresol and p-chlorophenol at $25°$ C. These polymers are not gelled and thus may be readily dissolved in certain organic solvents unlike gelled polysulfones and accordingly may also be readily hydrogenated. Although the unsaturated polysulfones are of relatively little commercial importance themselves due to their instability at even moderate temperatures, they may be hydrogenated to form valuable, stable and in some instances highly crystalline polymers which find a variety of uses. The highly crystalline polysulfones prepared according to this process are especially desirable since they may be easily melt spun into fibers for use in preparing textiles, fabrics and the like.

In order to hydrogenate the unsaturated polysulfones, it is necessary to place them in an organic solvent in which they are soluble or at least swollen. Thus, prior to hydrogenation the unsaturated polymers must be separated from the emulsion polymerization mixture. This is accomplished by coagulating the polymer where necessary by the addition of a material such as a lower aliphatic alcohol, electrolyte solution, etc. The product may then be filtered, washed and dried. Suitable media for the hydrogenation process are organic polar solvents such as sulfolane, perfluoro alcohols (i.e., trifluoro ethanol, perfluoroisopropanol, perfluoro-t-butanol, etc.) and especially the phenolic solvents (i.e., phenol, halo-phenols, alkyl phenols, etc.) in which the unsaturated polysulfones are soluble or swollen. The phenolic compounds need not be pure. Indeed, mixtures are often desirable (e.g., mixed cresols). Phenol p-chlorophenol, and the cresols are preferred. Generally for the terpolymers, heating to from about $25°$ C. to $150°$ C. in the presence of the solvents will induce solution. In the case of most of the terpolymeric sulfones, solution is accomplished at temperatures below the temperature at which decomposition occurs. In the case of many of the conjugated diene-sulfur dioxide copolymeric sulfones, especially that from butadiene, and their terpolymers containing only small amounts of termonomers, the polymer-solvent interaction at temperatures below the decomposition point may be limited to swelling.

The catalyst systems used in the hydrogenation reaction may be heterogeneous or homogeneous. Suitable heterogeneous catalysts include for example, platinum, rhodium, osmium, ruthernium, iridium, palladium, rhenium, nickel, cobalt, copper, chromium, iron and compounds thereof such as oxides, sulfides, carbonyls, etc. These catalysts may be used alone or supported on a relatively inert material such as carbon, diatomaceous earth, alumina, silica, asbestos, pumice, etc. In order to achieve more efficient hydrogenation, it may be necessary to keep the heterogenous catalysts dispersed throughout the polymer-containing solution such as by stirring the reaction mixture or agitating the reaction vessel. Amounts of catalyst between about 0.01 and 10% and preferably between about 0.1 and 5% by weight based on the polymer may be used.

Homogeneous catalysts offer the advantages of being rapidly dispersed throughout the reaction medium and of being less readily poisoned, thus permitting the hydrogenation of polysulfones which are only swollen by the solvent. Such homogeneous catalysts include among others the rhodium systems disclosed in copending application Ser. No. 417,482, filed Dec. 10, 1964, the descriptions of which are incorporated herein by reference. Preferred catalysts of this type are the rhodium halide complexes such as trichlorotris(triphenylarsine) rhodium (III) and chlorotris(triphenylphosphine) rhodium (I). The amount of catalyst used is sufficient to provide from about 50 to 2000 p.p.m. and preferably from 100 to 1000 p.p.m. rhodium based on the polymer.

The hydrogenation reaction temperature may be from about room temperature, i.e., approximately $20°$ C. to about 200° C. with temperatures between about 80° and 130° C. being preferred. The rate of hydrogenation will depend upon the particular polymer being reduced, the solvent, temperature, catalyst, solution viscosity, pressure, etc. Although hydrogenation would proceed slowly at one atmosphere of hydrogen pressure, it is normally desirable to use a large excess of hydrogen and thus hydrogen pressures of up to 10,000 p.s.i. or higher may be used; the preferred range is between about 500 and 2000 p.s.i. The hydrogen may be bubbled through the polymer containing solution or slurry of swollen polymer or may be charged into a closed reaction vessel under pressure and then mixed with the solution by suitable means. The hydrogenation of the unsaturated polysulfones by the method as disclosed herein only affects the ethylenic unsaturation and does not in any way reduce the stable sulfone portion of the polymers.

Although for some products, complete hydrogenation may be desirable it is not necessary since any degree of hydrogenation of the original ethylenic unsaturation above about 50% results in highly stable and high melting polymers. In the case of highly crystalline polysulfones it is found above about 50% that the degree of hydrogenation may be varied without greatly sacrificing the crystallinity. The hydrogenation polymers have molecular weights of between about 20,000 and 1,000,000 as characterized by intrinsic viscosity of from about 0.5 to 5.5 dl./g. determined in a 1:1 mixture of m-cresol and p-chlorophenol at 25° C.

The following examples are provided to illustrate the manner in which the invention is carried out. It is to be understood that the examples are given for the purpose of illustration only and the invention is not to be regarded as limited to any of the specific compounds or conditions recited therein. Unless otherwise indicated, parts and percents disclosed in the examples are given by weight.

Example I

A terpolymer of butadiene, sulfur dioxide and trans-piperylene was prepared as follows: 80 ml. of distilled water, 0.8 g. sodium lauryl sulfate, 0.50 g. of $NH_4NO_3$, 384 g. of liquid sulfur dioxide, 16.4 g. of butadiene and 20.1 g. piperylene were mixed in a closed 200 ml. bottle. The contents were stirred for about 1.6 hours at 25° C. The resulting polymer which was insoluble in the reaction medium was filtered, washed with methanol and dried. The polymer was gelled and could not be completely dissolved in p-chlorophenol.

The unsaturated gelled polymer (10.0 g.) was placed in a 300 ml. autoclave, along with 200 ml. of m-cresol and 0.050 g. of chlorotris (triphenylphosphine) rhodium (I) catalyst. The autoclave was then sealed, purged with hydrogen, heated to about 120° C. and pressurized to 1000 p.s.i. with hydrogen. The reaction mixture was continually agitated for 16 hours until hydrogenation was complete. The reaction mixture was then treated with methanol and the hydrogenated polymer was recovered by filtration. The gelled polymer could not be satisfactorily melt spun into fibers.

Examples II–XV

The procedure of Example I was repeated with the exception that 0.050 g. of a material as indicated in the table below was added to the initial polymerization mixture. In some instances, as indicated in the table, the unsaturated polymers were gelled and thus unaffected by the added material in which case the polymers were insoluble in suitable organic solvents and could not be easily hydrogenated nor could the hydrogenated products be easily extruded if at all due to the gel. In other examples wherein the added material was that used according to the present invention, the unsaturated polymers contained no gel, could be easily dissolved in hydrogenation solvent and the hydrogenated products could be readily melt spun into fibers.

TABLE I

| Example | Additive | Gel |
|---------|----------|-----|
| II | Lauryl mercaptan | Yes. |
| III | Chloroform | Yes. |
| IV | Carbon tetrachloride | Yes. |
| V | Dilauryl dithiopropionate | Yes. |
| VI | Phenylbetanaphthylamine | Yes. |
| VII | Zinc dibutyl dithiocarbamate | Yes. |
| VIII | tert-Butylamine | Yes. |
| IX | Methylaniline | Yes. |
| X | Phenol | No. |
| XI | m-Cresol | No. |
| XII | p-Tert-butyl catechol | No. |
| XIII | 2,6-di-tert-butyl-4-methylphenol | No. |
| XIV | Tri(nonylphenyl) phosphite | No. |
| XV | 2,6-di-tert-butylphenyl di-n-butyl borate | No. |

Similar results are obtained when isoprene is substituted for piperylene in preparing the polysulfones.

Example XVI

Into a reactor containing 1.5 liters distilled water, 10 g. sodium lauryl sulfate and 3.0 g. $(NH_4)_2S_2O_8$, was placed 111 g. butadiene and 132 g. styrene. The reactor was closed and maintained at 25±3° C. and the contents were stirred. $SO_2$ was then added continuously at the rate of about 3.3 g./minute. After 15, 25 and 30 minutes, respectively, 19, 38 and 64 grams of a make-up mixture of 60% butadiene and 40% styrene was added to the reaction mixture. After 40 minutes 325 grams of the butadiene-$SO_2$-styrene terpolymer was recovered. The polymer was gelled and could not be completely dissolved in m-cresol. The polymer was hydrogenated in a manner as set forth in Example I. The hydrogenated polymer was also gelled.

Example XVII

The procedure of Example XVI was repeated with the exception that 0.6 g. of 4-methyl-2,6-di-tert-butyl phenol was added to the initial reaction mixture prior to polymerization. The terpolymer recovered was not gelled and was completely soluble in m-cresol. The polymer was then hydrogenated and the ungelled product recovered.

I claim as my invention:

1. The method of preventing gelation of a polysulfone selected from the group consisting of
   a copolymer of a conjugated diolefin having from 4 to about 8 carbon atoms and sulfur dioxide, and a polymer of a conjugated diolefin having from 4 to about 8 carbon atoms, sulfur dioxide and at least one copolymerizable ethylenically unsaturated monomer having from 2 to about 20 carbon atoms prepared in an emulsion in the presence of a free radical initiator comprising the step of adding to the polymerization mixture from about 0.001 and 1% by weight based on the total reaction mixture of a compound selected from the group consisting of
   (a) a phenol,
   (b) a triaryl phosphite, and
   (c) an aryl borate.
2. A method as set forth in claim 1 wherein the conjugated diolefin is butadiene.
3. A method as set forth in claim 1 wherein the ethylenically unsaturated compound is a conjugated diolefin having from 5 to about 8 carbon atoms.
4. A method as set forth in claim 3 wherein the ethylenically unsaturated compound is piperylene.
5. A method as set forth in claim 1 wherein the ethylenically unsaturated compound is a vinyl aromatic compound having from 8 to about 12 carbon atoms.
6. A method as set forth in claim 5 wherein the ethylenically unsaturated compound is styrene.

References Cited

UNITED STATES PATENTS 3,336,274    8/1967    Youngman et al. _____ 260—79.3

JOSEPH L. SCHOFER, *Primary Examiner.*

D. K. DENENBERG, *Assistant Examiner.*